United States Patent
Jeong et al.

(10) Patent No.: US 9,432,151 B2
(45) Date of Patent: Aug. 30, 2016

(54) METHOD AND APPARATUS FOR AUTOMATIC REPEAT REQUEST (ARQ) IN BROADBAND WIRELESS ACCESS SYSTEM

(75) Inventors: Hye-Yeon Jeong, Suwon-si (KR);
Sung-Wook Park, Seongnam-si (KR);
Jeong-Hoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1805 days.

(21) Appl. No.: 12/291,276

(22) Filed: Nov. 7, 2008

(65) Prior Publication Data

US 2009/0125775 A1    May 14, 2009

(30) Foreign Application Priority Data

Nov. 8, 2007  (KR) .................. 10-2007-0113529

(51) Int. Cl.
*G06F 11/00*  (2006.01)
*H04L 1/18*  (2006.01)

(52) U.S. Cl.
CPC .................................... *H04L 1/1887* (2013.01)

(58) Field of Classification Search
CPC ................................................ G06F 11/0745
See application file for complete search history.

(56) References Cited

U.S. PATENT DOCUMENTS

| | | | |
|---|---|---|---|
| 7,676,721 B2* | 3/2010 | Kim | 714/747 |
| 7,757,148 B2* | 7/2010 | Schaap et al. | 714/748 |
| 7,978,625 B2* | 7/2011 | Ju et al. | 370/252 |
| 7,979,767 B2* | 7/2011 | Schaap et al. | 714/748 |
| 7,979,768 B2* | 7/2011 | Sammour et al. | 714/748 |
| 7,991,352 B2* | 8/2011 | Suh et al. | 455/8 |
| 2007/0277072 A1* | 11/2007 | Schaap et al. | 714/748 |
| 2010/0241919 A1* | 9/2010 | Jeon | 714/750 |

FOREIGN PATENT DOCUMENTS

| | | |
|---|---|---|
| KR | 1020060061897 | 6/2006 |
| KR | 1020060080490 | 7/2006 |
| KR | 1020060080553 | 7/2006 |

* cited by examiner

*Primary Examiner* — Christopher McCarthy

(57) ABSTRACT

An apparatus and a method for Automatic Repeat reQuest (ARQ) in a broadband wireless access system are provided. The method includes driving a timer which operates by a preset period to synchronize ARQ between the transmitter and a receiver; after transmitting data to the receiver without error, when a driving time of the timer expires, checking whether there is data to transmit to the receiver; when there is no data to transmit to the receiver, initializing the timer; and transmitting an ARQ reset message to the receiver. Hence, the air resource consumption and the power consumption in ARQ reset can be lowered by reducing unnecessary ARQ reset.

20 Claims, 5 Drawing Sheets

METHOD AND APPARATUS FOR AUTOMATIC REPEAT REQUEST (ARQ) IN BROADBAND WIRELESS ACCESS SYSTEM

CROSS-REFERENCE TO RELATED APPLICATION(S) AND CLAIM OF PRIORITY

This application claims the benefit under 35 U.S.C. §119(a) to a Korean patent application filed in the Korean Intellectual Property Office on Nov. 8, 2007 and assigned Serial No. 10-2007-0113529, the entire disclosure of which is hereby incorporated by reference.

TECHNICAL FIELD OF THE INVENTION

The present invention relates generally to a method and an apparatus for Automatic Repeat reQuest (ARQ) in a broadband wireless access system. More particularly, the present invention relates to a method and an apparatus for preventing unnecessary reset of data retransmission in the broadband wireless access system.

BACKGROUND OF THE INVENTION

According to the state of a radio channel, transmit data is subject to error in a wireless communication system. The wireless communication system can control and recover the data error using an Automatic Repeat reQuest (ARQ) scheme or a Forward Error Correction (FEC) scheme.

A mobile station (MS) determines whether to employ the ARQ scheme in a registration procedure with its serving base station (BS) or in a service flow connection. When determining to use the ARQ scheme, the MS negotiates parameters required by the ARQ with the serving BS.

In negotiating the parameters required for the ARQ scheme, the serving BS and the MS determine ARQ_SYNC_LOSS_TIMEOUT for synchronization between the transmitter ARQ and the receiver ARQ.

The transmitter resets a timer which operates by the period ARQ_SYNC_LOSS_TIMEOUT upon every updating of ARQ_TX_WINDOW_START for ARQ synchronization with the receiver.

When ARQ_RX_WINDOW_START is updated or data valid in an ARQ RX window is received, the receiver resets the timer which operates by the period ARQ_SYNC_LOSS_TIMEOUT for ARQ synchronization with the transmitter.

When the driving time of the timer which operates by the period ARQ_SYNC_LOSS_TIMEOUT exceeds ARQ_SYNC_LOSS_TIMEOUT, the transmitter and the receiver reset the ARQ. For instance, the wireless communication system maintains ARQ synchronization of the transmitter and the receiver using ARQ_SYNC_LOSS_TIMEOUT as shown in FIG. 1.

FIG. 1 illustrates signal flows for ARQ reset in a conventional broadband wireless access system.

A transmitter 100 sends data received from an upper stage to a receiver 120 in step 101. In so doing, the transmitter 100 drives a first timer which operates by the period ARQ_SYNC_LOSS_TIMEOUT in step 103.

In step 105, the receiver 120, upon receiving the data without error from the transmitter 100, drives a second timer which operates by the period ARQ_SYNC_LOSS_TIMEOUT.

In step 107, the receiver 120 sends ARQ feedback information of the received data to the transmitter 100.

Upon receiving the ARQ feedback information of the data transmitted to the receiver 120, the transmitter 100 resets the first timer in step 109.

When the first timer expires, the transmitter 100 and the receiver 120 transmit and receive ARQ reset messages in step 111. In so doing, the transmitter 100 and the receiver 120 reset the ARQ.

When the first timer expires, the first timer is reset to drive continuously in step 113.

When the first timer expires again, the transmitter 100 and the receiver 120 transmit and receive ARQ reset messages in step 115. In so doing, the transmitter 100 and the receiver 120 reset the ARQ.

In the ARQ as discussed above, the transmitter and the receiver operate the timer which operates by the period ARQ_SYNC_LOSS_TIMEOUT to keep the ARQ synchronized. When the timer expires, the transmitter and the receiver recognize that the ARQ is out-of-synchronization and reset the ARQ.

However, since the timer continues to operate after the ARQ reset, the ARQ reset is repeated even though the ARQ window is empty.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide a method and an apparatus for providing Automatic Repeat reQuest (ARQ) in a broadband wireless access system.

Another aspect of the present invention is to provide a method and an apparatus for preventing the unnecessary reset of an ARQ operation in a broadband wireless access system.

Yet another aspect of the present invention is to provide a method and an apparatus for preventing the unnecessary reset of an ARQ operation in a broadband wireless access system, when ARQ window is empty.

The above aspects are achieved by providing a method for ARQ at a transmitter of a communication system. The method includes driving a timer which operates by a preset period to synchronize ARQ between the transmitter and a receiver; after transmitting data to the receiver without error, when a driving time of the timer expires, checking whether there is data to transmit to the receiver; when there is no data to transmit to the receiver, initializing the timer; and transmitting an ARQ reset message to the receiver.

According to one aspect of the present invention, a method for ARQ at a receiver of a communication system includes when receiving data from a transmitter without error, driving a timer which operates by a period set to synchronize ARQ between the transmitter and the receiver; when receiving an ARQ reset message, checking whether the ARQ reset message comprises an information indicating that there is no more data to transmit from the transmitter to the receiver; and when the ARQ reset message comprises the information indicating that there is no more data to transmit from the transmitter to the receiver, initializing the timer.

According to another aspect of the present invention, an apparatus of a transmitter for ARQ at a receiver of a communication system includes a timer for operating by a period set to synchronize ARQ between the transmitter and a receiver; a controller for, after data is transmitted to the receiver without error, when a driving time of the timer expires, controlling the timer according to a presence or an absence of data to transmit to the receiver; and a communicator for transmitting an ARQ reset message to the receiver under control of the controller.

According to yet another aspect of the present invention, an apparatus of a receiver for ARQ at a receiver of a communication system includes a timer for operating by a period set to synchronize ARQ between a transmitter and the receiver when data is received from the transmitter without error; a communicator for receiving data and an ARQ reset message from the transmitter; and a controller for initializing the timer when the ARQ reset message received from the transmitter comprises information indicating that there is no more data to transmit to the receiver.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for reducing unnecessary Automatic Repeat reQuest (ARQ) reset in a broadband wireless access system which adopts ARQ.

Figure 1:
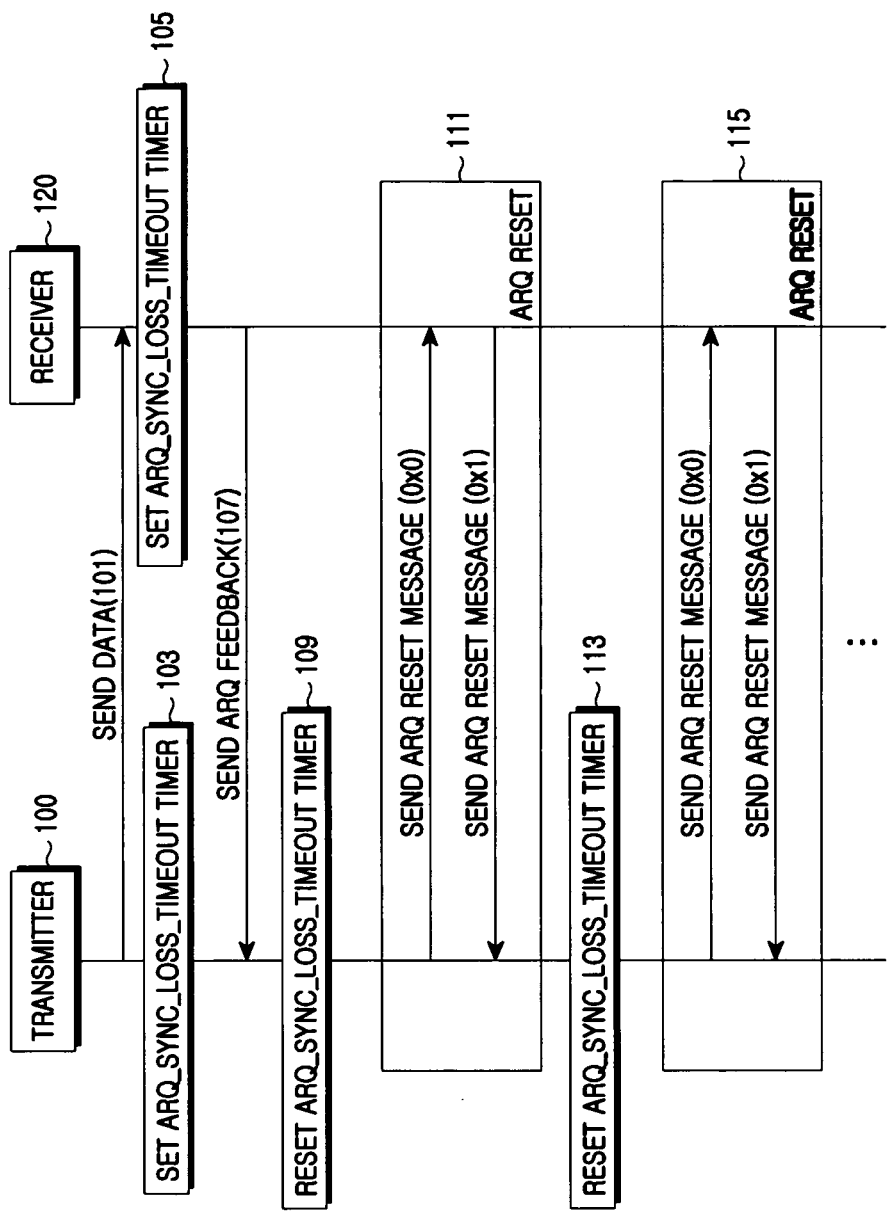
FIG. 1 illustrates signal flows for resetting Automatic Repeat reQuest (ARQ) in a conventional broadband wireless access system.
Figure 2:
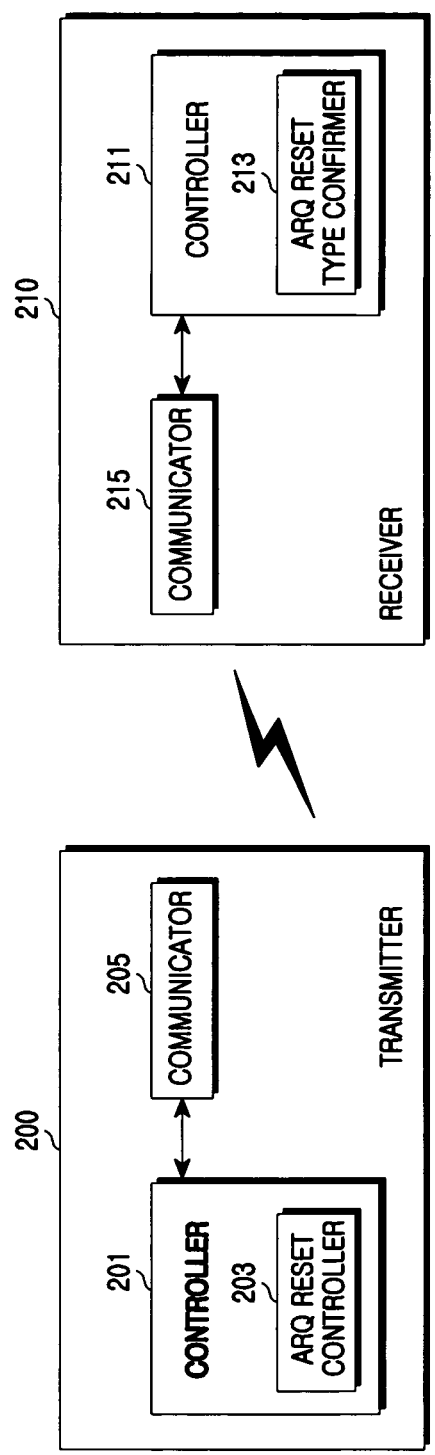
FIG. 2 illustrates a system for ARQ in a broadband wireless access system according to an exemplary embodiment of the present invention.

FIG. 2 is a block diagram of a system for ARQ in a broadband wireless access system according to an exemplary embodiment of the present invention.

The broadband wireless access system of FIG. 2 includes a transmitter 200 and a receiver 210.

The transmitter 200 includes a controller 201, an ARQ reset controller 203, and a communicator 205.

The controller 201 controls operations of the transmitter 200. More particularly, the controller 201 controls ARQ to recover data having error. For example, upon receiving a NACK signal from the receiver 210, the controller 201 causes the data to be retransmitted in response to the NACK signal. When the data transmission to the receiver 210 is completed and a driving time of a first timer for synchronizing ARQ with the receiver 210 exceeds ARQ_SYNC_LOSS_TIMEOUT, the controller 201 checks whether there exists data to transmit in an ARQ TX window. Herein, the first timer represents an ARQ_SYNC_LOSS_TIMEOUT timer of the transmitter, which operates by the period ARQ_SYNC_LOSS TIMEOUT.

The ARQ reset controller 203 controls the first timer depending on the presence or the absence of data to transmit. In more detail, when the controller 201 confirms the absence of data to transmit, the ARQ reset controller 203 aborts the driving of the first timer. Herein, the ARQ reset controller 203 suspends the driving of the first timer until data to transmit is detected.

When the controller 201 confirms the absence of data to transmit, the ARQ reset controller 203 controls to send an ARQ reset message to the receiver 210. Herein, the ARQ reset message includes information indicating that there is no more data to transmit from the transmitter 200. For example, the ARQ reset controller 203 causes an ARQ reset message with a message type defined as 0x3 to be sent to the transmitter 210.

The communicator 205 transmits and receives radio signals of data input and output via an antenna. For example, to transmit data according to Orthogonal Frequency Division Multiplexing (OFDM), the communicator 205 encodes and modulates the data. Next, the communicator 205 OFDM-modulates the modulated data, converts to a radio frequency (RF) signal, and transmits the RF signal to the receiver 210 over the antenna. Upon receiving data according to the OFDM scheme, the communicator 205 converts the RF signal received over the antenna to a baseband signal and OFDM-demodulates the baseband signal. Next, the communicator 205 recovers the data by demodulating and decoding the OFDM-demodulated data. Alternatively, using a Code Division Multiple Access (CDMA) scheme, the communicator 205 performs spreading instead of the OFDM modulation and performs despreading instead of the OFDM demodulation.

Under the control of the ARQ reset controller 203, the communicator 205 sends the ARQ reset message to the receiver 210.

The receiver 210 includes a controller 211, an ARQ reset type confirmer 213, and a communicator 215.

The communicator 215 transmits and receives radio signals of data input and output via an antenna. For example, to transmit data using the OFDM scheme, the communicator 215 encodes and modulates the data. Next, the communicator 215 OFDM-modulates the modulated data, converts to an RF signal, and transmits the RF signal to the transmitter 200 over the antenna. Upon receiving data according to the OFDM scheme, the communicator 215 converts the RF signal received over the antenna to a baseband signal and OFDM-demodulates the baseband signal. Next, the communicator 215 recovers the data by demodulating and decoding the OFDM-demodulated data. Alternatively, using the CDMA scheme, the communicator 215 performs spreading instead of the OFDM modulation and performs despreading instead of the OFDM demodulation.

The communicator 215 receives the ARQ reset message from the transmitter 200.

The controller 211 controls operations of the receiver 210. In further detail, the controller 211 controls ARQ to recover data having error. For instance, when data received from the transmitter 200 is corrupted, the controller 211 causes a NACK signal to be sent to the transmitter 200. Conversely, when data received from the transmitter 200 is free from error, the controller 211 causes an ACK signal to be sent to the transmitter 200.

The ARQ reset type confirmer 213 checks the type of the ARQ reset message received through the communicator 215. The controller 211 controls the second timer which operates by the period ARQ_SYNC_LOSS_TIMEOUT depending on the type of the ARQ reset message confirmed at the ARQ reset type confirmer 213. For example, when the type of the ARQ reset message received from the transmitter 200 is 0x3, the controller 211 aborts the driving of the second timer. Herein, the controller 211 suspends the driving of the second timer until new data is received. The second timer represents the ARQ_SYNC_LOSS_TIMEOUT timer of the receiver 210, operating by the period ARQ_SYNC_LOSS_TIMEOUT.

Figure 3:
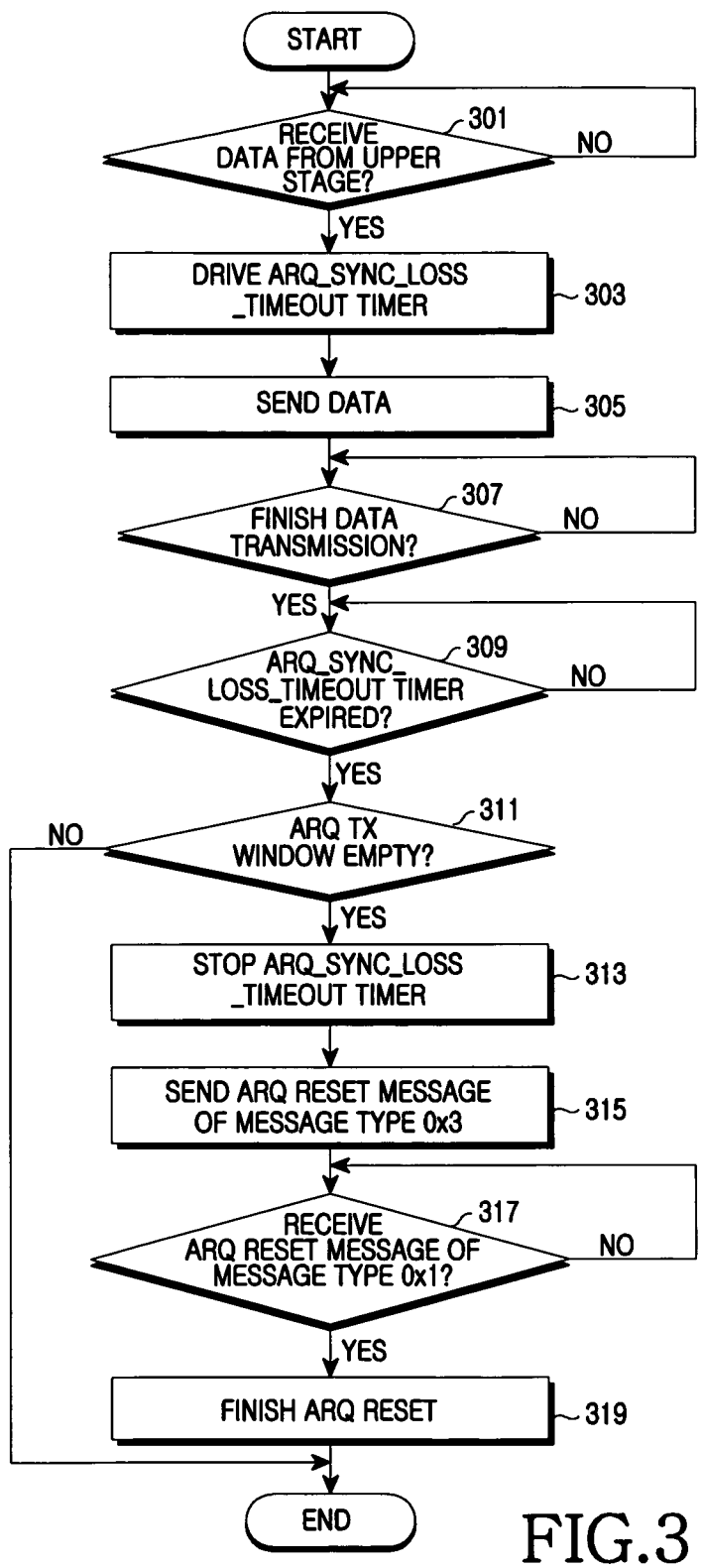
FIG. 3 illustrates operations of a transmitter for resetting ARQ in a broadband wireless access system according to an exemplary embodiment of the present invention.

FIG. 3 is a flowchart outlining a method for resetting ARQ at the transmitter in a broadband wireless access system according to an exemplary embodiment of the present invention.

In step 301, a transmitter checks whether data is received from the upper stage.

When receiving data from the upper stage, the transmitter drives the first timer which operates by the period ARQ_SYNC_LOSS_TIMEOUT in step 303.

In step 305, the transmitter sends the data received from the upper stage to a receiver.

In step 307, the transmitter checks whether the data transfer to the receiver in step 305 is finished or not.

When the data transfer is completed, the transmitter checks whether the first timer expires in step 309. That is, the transmitter checks whether the first timer is reset.

When the first timer expires, the transmitter checks whether there is data to transmit to the receiver based on the ARQ TX window in step 311.

When there exists data in the ARQ TX window, the transmitter determines the presence of data to transmit to the receiver. Thus, the transmitter finishes this process. At this time, the transmitter may reset the ARQ. For instance, the transmitter sends the ARQ reset message with the message type 0x0 to the receiver.

By contrast, when the ARQ TX window is empty, the transmitter determines the absence of data to transmit to the receiver. Hence, the transmitter stops the first timer in step 313.

In step 315, the transmitter sends the ARQ reset message of the message type 0x3 to the receiver. The ARQ reset message of the message type 0x3 includes information indicative of no more data to transmit from the transmitter.

In step 317, the transmitter checks whether a response message to the ARQ reset message is received from the receiver. For example, the transmitter checks whether the ARQ reset message of the message type 0x1 is received or not.

Upon receiving the ARQ reset message from the receiver, the transmitter completes the ARQ reset in step 319.

Next, the transmitter finishes this process.

In this embodiment as mentioned above, upon receiving the data from the upper stage, the transmitter drives the first timer. Alternatively, the transmitter may drive the first timer when transmitting new data to the receiver.

Figure 4:
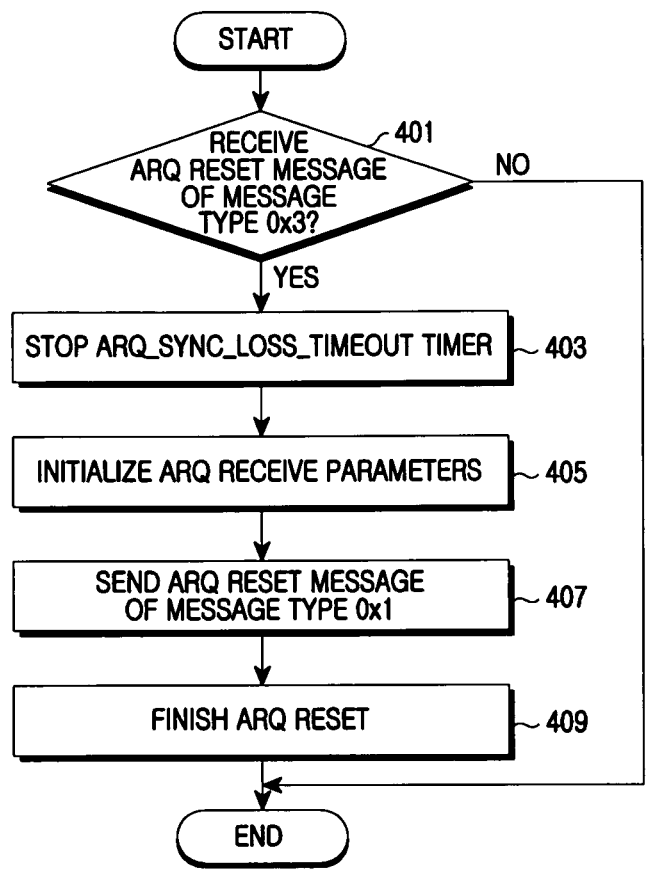
FIG. 4 illustrates operations of a receiver for resetting ARQ in a broadband wireless access system according to an exemplary embodiment of the present invention.

FIG. 4 is a flowchart outlining a method for a receiver to reset ARQ in the broadband wireless access system according to an exemplary embodiment of the present invention.

In step 401, a receiver checks whether an ARQ reset message of the message type 0x3 is received from a transmitter. Herein, the ARQ reset message with the message type 0x3 includes information indicative of no more data to transmit from the transmitter.

When receiving no ARQ reset message or when receiving the ARQ reset message without the message type 0x3, the receiver finishes this process.

When receiving the ARQ reset message having the message type 0x3, the receiver stops the second timer which operates by the period ARQ_SYNC_LOSS_TIMEOUT in step 403. Herein, the second timer operates when the receiver receives new data without error from the transmitter.

In step 405, the receiver initializes ARQ receive parameters.

In step 407, the receiver sends a response message to the transmitter in reply to the ARQ reset message of the message type 0x3 received in step 401. For example, the receiver sends the ARQ reset message of the message type 0x1 to the transmitter.

In step 409, the receiver completes the ARQ reset.

Next, the receiver finishes this process.

Figure 5:
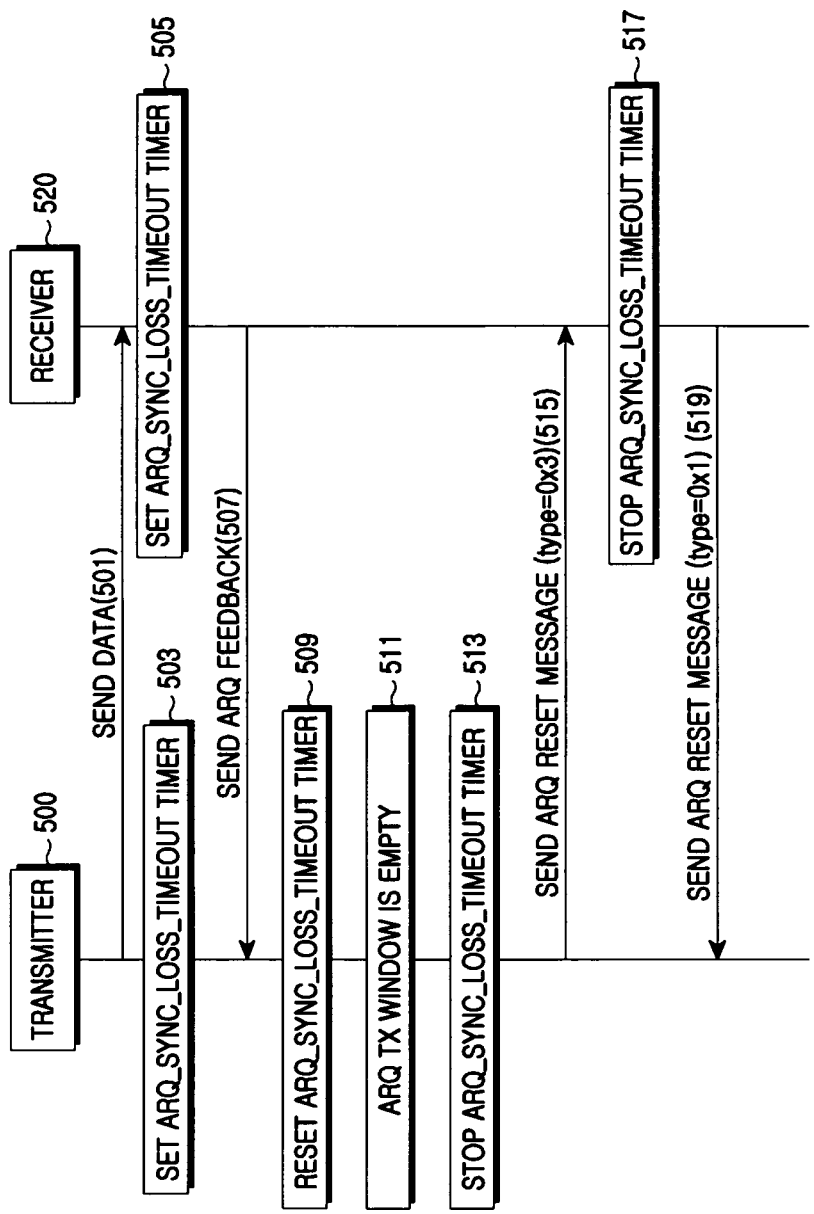
FIG. 5 illustrates signal flows for resetting ARQ in a broadband wireless access system according to an exemplary embodiment of the present invention.

FIG. 5 is a signal flow diagram for resetting ARQ in the broadband wireless access system according to an exemplary embodiment of the present invention.

A transmitter 500 sends data received from the upper stage to a receiver 520 in step 501. In doing so, the transmitter 500 drives the first timer which operates by the period ARQ_SYNC_LOSS_TIMEOUT in step 503. Alternatively, upon receiving data from the upper stage, the transmitter 500 may drive the first timer. Herein, the first timer represents the ARQ_SYNC_LOSS_TIMEOUT timer of the transmitter 500, operating by the period ARQ_SYNC_LOSS_TIMEOUT.

When receiving the data without error from the transmitter 500, the receiver 520 drives the second timer operating by the period ARQ_SYNC_LOSS_TIMEOUT in step 505. Next, the receiver 520 sends ARQ feedback information of the received data to the transmitter 500 in step 507. Herein, the second timer represents the ARQ_SYNC_LOSS_TIMEOUT timer of the receiver 520, operating by the period ARQ_SYNC_LOSS_TIMEOUT.

Receiving the ARQ feedback information in relation to the data sent to the receiver 520, the transmitter 500 resets the first timer in step 509.

When the first timer expires, the transmitter 500 checks whether there is data to transmit to the receiver 520 based on the ARQ TX window in step 511. When the ARQ TX window is empty, the transmitter 500 determines the absence of the data to transmit to the receiver 520. Hence, the transmitter 500 stops the first timer in step 513. In so doing, the transmitter 500 suspends the driving of the first timer until new data to transmit is detected.

Next, the transmitter 500 sends the ARQ reset message of the message type 0x3 to the receiver 520 in step 515. Herein, the ARQ reset message of the message type 0x3 includes the information indicative of no more data to transmit from the transmitter 500.

Receiving the ARQ reset message of the message type 0x3 from the transmitter 500, the receiver 520 stops the second timer in step 517. The receiver 520 suspends the driving of the second timer until new data is received.

Next, the receiver 520 sends a response message to the transmitter 500 in reply to the ARQ reset message of the message type 0x3 in step 519. For example, the receiver 520 sends the ARQ reset message of the message type 0x1 to the transmitter 500.

As stated above, when there is no data to transmit in the broadband wireless access system, the timers for the ARQ synchronization between the transmitter and the receiver are stopped. Therefore, the air resource consumption and the power consumption in the ARQ reset can be lowered by reducing the unnecessary ARQ reset.

While the invention has been shown and described with reference to certain exemplary embodiments thereof, it will be understood by those skilled in the art that various changes in form and details may be made therein without departing from the spirit and scope of the invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for Automatic Repeat reQuest (ARQ) at a transmitter of a communication system, the method comprising:
   driving a timer which operates by a preset period to synchronize automatic repeat requests between the transmitter and a receiver when receiving data from an upper stage or transmitting data to the receiver;
   after transmitting data to the receiver without error, when a driving time of the timer expires, checking whether there is data to transmit to the receiver by checking whether there is data in an ARQ transmission (TX) window, wherein a presence of data to transmit to the receiver is determined when there is data in the ARQ TX window, and wherein an absence of the data to transmit to the receiver is determined when there is no data in the ARQ TX window; and
   when there is no data to transmit to the receiver, stopping the timer and transmitting an ARQ reset message to the receiver.

2. The method of claim 1, wherein the timer operates according to an ARQ_SYNC_LOSS_TIMEOUT period.

3. The method of claim 1, wherein the ARQ reset message comprises information indicative of the absence of data to transmit to the receiver.

4. The method of claim 1, further comprising:
   initializing the timer;
   after initializing the timer, checking whether there is data to transmit to the receiver; and
   when there is data to transmit to the receiver, resetting the timer.

5. The method of claim 1, further comprising:
   after transmitting the ARQ reset message, checking whether a response message of the ARQ reset message is received from the receiver; and
   when receiving the response message, finishing the ARQ reset.

6. The method of claim 5, wherein the response message is an ARQ reset message of a different message type from the ARQ reset message transmitted to the receiver.

7. The method of claim 1, further comprising transmitting the data to the receiver using an orthogonal Frequency Division Multiplexing (OFDM) protocol.

8. An apparatus of a transmitter configured to provide Automatic Repeat reQuest (ARQ) at a receiver of a communication system, the apparatus comprising:
   a timer configured to operate by a period set to synchronize automatic repeat request between the transmitter and the receiver;
   a controller configured to, after data is transmitted to the receiver without error, when a driving time of the timer expires, control the timer according to a presence or an absence of data to transmit to the receiver; and
   a communicator configured to transmit an ARQ reset message to the receiver under control of the controller,
   wherein the controller is further configured to
      check whether there is data in an ARQ transmission (TX) window;
      determine the presence of data to transmit to the receiver when there is data in the ARQ TX window; and
      determine the absence of data to transmit to the receiver when there is no data in the ARQ TX window,
   wherein the timer is driven when receiving data from an upper stage or transmitting data to the receiver.

9. The apparatus of claim 8, wherein the timer is further configured to operate according to an ARQ_SYNC_LOSS_TIMEOUT period when the data is received from an upper stage or when data is transmitted to the receiver.

10. The apparatus of claim 8, wherein the controller is further configured to stop the timer when there is no more data to transmit to the receiver.

11. The apparatus of claim 8, wherein when there is data to transmit to the receiver after the timer is initialized, the controller is further configured to reset the timer.

12. The apparatus of claim 8, wherein when there is no data in the ARQ TX window, the ARQ reset message comprises information indicative of the absence of data to transmit to the receiver.

13. The apparatus of claim 8, wherein the communicator is configured to transmit the ARQ reset message according to an orthogonal Frequency Division Multiplexing (OFDM) protocol.

14. Code embodied on a non-transitory computer-readable medium, when executed by a processor, configured to perform at least the following:

drive a timer which operates by a preset period to synchronize automatic repeat requests between the transmitter and a receiver when receiving data from an upper stage or transmitting data to the receiver;

after transmitting data to the receiver without error, when a driving time of the timer expires, check whether there is data to transmit to the receiver by checking whether there is data in an Automatic Repeat reQuest (ARQ) transmission (TX) window, wherein a presence of data to transmit to the receiver is determined when there is data in the ARQ TX window, and wherein an absence of the data to transmit to the receiver is determined when there is no data in the ARQ TX window; and when there is no data to transmit to the receiver, stop the timer and transmitting an ARQ reset message to the receiver.

15. The code of claim 14, wherein the timer operates according to an ARQ_SYNC_LOSS_TIMEOUT period.

16. The code of claim 14, wherein the ARQ reset message comprises information indicative of the absence of data to transmit to the receiver.

17. The code of claim 14, further configured to:

initialize the timer;

after initializing the timer, check whether there is data to transmit to the receiver; and when there is data to transmit to the receiver, reset the timer.

18. The code of claim 14, further configured to:

after transmitting the ARQ reset message, check whether a response message of the ARQ reset message is received from the receiver; and when receiving the response message, finish the ARQ reset.

19. The code of claim 18, wherein the response message includes an ARQ reset message of a different message type from the ARQ reset message transmitted to the receiver.

20. The code of claim 14, further configured to transmit the data to the receiver using an orthogonal Frequency Division Multiplexing (OFDM) protocol.

* * * * *